US010087885B2

(12) United States Patent
Kohlenberg et al.

(10) Patent No.: US 10,087,885 B2
(45) Date of Patent: *Oct. 2, 2018

(54) GAS TURBINE ENGINE WITH AXIAL MOVABLE FAN VARIABLE AREA NOZZLE

(71) Applicant: United Technologies Corporation, Farmington, CT (US)

(72) Inventors: Gregory A. Kohlenberg, Kensington, CT (US); Sean P. Zamora, Conventry, CT (US)

(73) Assignee: United Technologies Corporation, Farmington, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/729,748

(22) Filed: Oct. 11, 2017

(65) Prior Publication Data
US 2018/0045139 A1 Feb. 15, 2018

Related U.S. Application Data

(63) Continuation of application No. 15/360,053, filed on Nov. 23, 2016, now Pat. No. 9,822,732, which is a
(Continued)

(51) Int. Cl.
F02K 1/09 (2006.01)
F02K 1/00 (2006.01)
(Continued)

(52) U.S. Cl.
CPC ............ *F02K 1/18* (2013.01); *B64D 27/16* (2013.01); *B64D 31/00* (2013.01); *B64D 33/04* (2013.01);
(Continued)

(58) Field of Classification Search
CPC ........... B64D 33/04; B64D 27/16; F02K 1/30; F02K 1/72; F02K 3/06; F02K 1/15;
(Continued)

(56) References Cited

U.S. PATENT DOCUMENTS 2,258,792 A 4/1941 New
2,936,655 A 5/1960 Peterson et al.
(Continued)

FOREIGN PATENT DOCUMENTS

EP 0791383 8/1997
EP 1142850 10/2001
(Continued)

OTHER PUBLICATIONS

McMillian, A. (2008) Material development for fan blade containment casing. Abstract. p. 1. Conference on Engineering and Physics: Synergy for Success 2006. Journal of Physics: Conference Series vol. 105. London, UK. Oct. 5, 2006.
(Continued)

*Primary Examiner* — Mark Laurenzi
*Assistant Examiner* — Anthony Ayala Delgado
(74) *Attorney, Agent, or Firm* — Carlson, Gaskey & Olds, P.C.

(57) ABSTRACT

A turbofan engine according to an example of the present disclosure includes, among other things, a fan section including a plurality of fan blades, the plurality of fan blades having a fixed stagger angle and a design angle of incidence, a low pressure turbine driving the plurality of fan blades through a gear train, a fan nacelle and a core nacelle extending along an engine axis of rotation, the fan nacelle at least partially surrounding the core nacelle and the plurality of fan blades, a fan bypass flow path defined between the core nacelle and the fan nacelle, the core nacelle contoured along the fan bypass flow path with respect to the engine axis of rotation, and a fan variable area nozzle in communication with a controller and with the fan bypass flow path, and defining a fan nozzle exit area between the fan nacelle and the core nacelle.

30 Claims, 8 Drawing Sheets

Related U.S. Application Data continuation of application No. 13/314,365, filed on Dec. 8, 2011, now Pat. No. 9,701,415, which is a continuation-in-part of application No. 11/843,675, filed on Aug. 23, 2007, now Pat. No. 8,074,440.

(51) Int. Cl.

| | | |
|---|---|---|
| *F02K 1/82* | (2006.01) | |
| *F02K 1/18* | (2006.01) | |
| *F04D 29/32* | (2006.01) | |
| *B64D 27/16* | (2006.01) | |
| *F02C 7/36* | (2006.01) | |
| *F04D 29/38* | (2006.01) | |
| *F01D 5/06* | (2006.01) | |
| *F01D 25/24* | (2006.01) | |
| *F02K 3/06* | (2006.01) | |
| *F04D 29/52* | (2006.01) | |
| *F04D 29/56* | (2006.01) | |
| *B64D 31/00* | (2006.01) | |
| *F02K 1/72* | (2006.01) | |
| *F02K 1/30* | (2006.01) | |
| *B64D 33/04* | (2006.01) | |

(52) U.S. Cl.
CPC .............. *F01D 5/06* (2013.01); *F01D 25/24* (2013.01); *F02C 7/36* (2013.01); *F02K 1/30* (2013.01); *F02K 1/72* (2013.01); *F02K 3/06* (2013.01); *F04D 29/321* (2013.01); *F04D 29/325* (2013.01); *F04D 29/38* (2013.01); *F04D 29/522* (2013.01); *F04D 29/563* (2013.01); *F05D 2220/323* (2013.01); *F05D 2220/36* (2013.01); *F05D 2230/50* (2013.01); *F05D 2240/128* (2013.01); *F05D 2260/40311* (2013.01); *F05D 2270/3015* (2013.01)

(58) Field of Classification Search
CPC ........... F05D 2240/128; F05D 2220/36; F05D 2220/323; F05D 2220/32; F05D 2270/3015; F01D 17/14; F01D 5/02; F01D 25/24; F02C 9/20; F04D 29/321; F04D 29/325; F04D 29/38; F04D 29/522; F04D 29/563

See application file for complete search history.

(56) References Cited

U.S. PATENT DOCUMENTS

| | | | |
|---|---|---|---|
| 3,021,731 A | 2/1962 | Stoeckicht | |
| 3,194,487 A | 7/1965 | Tyler et al. | |
| 3,287,906 A | 11/1966 | McCormick | |
| 3,352,178 A | 11/1967 | Lindgren et al. | |
| 3,412,560 A | 11/1968 | Gaubatz | |
| 3,747,343 A | 7/1973 | Rosen | |
| 3,754,484 A | 8/1973 | Roberts | |
| 3,779,010 A | 12/1973 | Chamay et al. | |
| 3,820,719 A | 6/1974 | Clark | |
| 3,892,358 A | 7/1975 | Gisslen | |
| 3,932,058 A | 1/1976 | Harner et al. | |
| 3,935,558 A | 1/1976 | Miller et al. | |
| 3,988,889 A | 11/1976 | Chamay et al. | |
| 4,054,030 A | 10/1977 | Pedersen | |
| 4,086,761 A | 5/1978 | Schaut et al. | |
| 4,130,872 A | 12/1978 | Harloff | |
| 4,137,708 A | 2/1979 | Aspinwall et al. | |
| 4,284,174 A | 8/1981 | Salvana et al. | |
| 4,327,548 A | 5/1982 | Woodward | |
| 4,478,551 A | 10/1984 | Honeycutt, Jr. et al. | |
| 4,649,114 A | 3/1987 | Miltenburger et al. | |
| 4,696,156 A | 9/1987 | Burr et al. | |
| 4,922,713 A | 5/1990 | Barbarin et al. | |
| 4,979,362 A | 12/1990 | Vershure, Jr. | |
| 5,102,379 A | 4/1992 | Pagluica et al. | |
| 5,141,400 A | 8/1992 | Murphy et al. | |
| 5,169,288 A | 12/1992 | Gliebe et al. | |
| 5,317,877 A | 6/1994 | Stuart | |
| 5,433,674 A | 7/1995 | Sheridan et al. | |
| 5,447,411 A | 9/1995 | Curley et al. | |
| 5,466,198 A | 11/1995 | McKibbin et al. | |
| 5,524,847 A | 6/1996 | Brodell et al. | |
| 5,577,381 A | 11/1996 | Eigenbrode et al. | |
| 5,586,431 A | 12/1996 | Thonebe et al. | |
| 5,593,112 A | 1/1997 | Maier et al. | |
| 5,655,360 A | 8/1997 | Butler | |
| 5,677,060 A | 10/1997 | Terentieva et al. | |
| 5,778,659 A | 7/1998 | Duesler et al. | |
| 5,806,302 A | 9/1998 | Cariola et al. | |
| 5,833,140 A | 11/1998 | Loffredo et al. | |
| 5,853,148 A | 12/1998 | Standish et al. | |
| 5,857,836 A | 1/1999 | Stickler et al. | |
| 5,915,917 A | 6/1999 | Eveker et al. | |
| 5,971,229 A | 10/1999 | May et al. | |
| 5,975,841 A | 11/1999 | Lindemuth et al. | |
| 5,985,470 A | 11/1999 | Spitsberg et al. | |
| 6,158,210 A | 12/2000 | Orlando | |
| 6,223,616 B1 | 5/2001 | Sheridan | |
| 6,315,815 B1 | 11/2001 | Spadaccini et al. | |
| 6,318,070 B1 | 11/2001 | Rey et al. | |
| 6,378,293 B1 | 4/2002 | Care et al. | |
| 6,387,456 B1 | 5/2002 | Eaton, Jr. et al. | |
| 6,517,341 B1 | 2/2003 | Brun et al. | |
| 6,607,165 B1 | 8/2003 | Manteiga et al. | |
| 6,619,030 B1 | 9/2003 | Seda et al. | |
| 6,622,473 B2 | 9/2003 | Becquerelle et al. | |
| 6,709,492 B1 | 3/2004 | Spadaccini et al. | |
| 6,732,502 B2 | 5/2004 | Seda et al. | |
| 6,814,541 B2 | 11/2004 | Evans et al. | |
| 6,971,229 B2 | 12/2005 | Lair | |
| 7,021,042 B2 | 4/2006 | Law | |
| 7,328,580 B2 | 2/2008 | Lee et al. | |
| 7,374,403 B2 | 5/2008 | Decker et al. | |
| 7,591,754 B2 | 9/2009 | Duong et al. | |
| 7,662,059 B2 | 2/2010 | McCune | |
| 7,806,651 B2 | 10/2010 | Kennepohl et al. | |
| 7,824,305 B2 | 11/2010 | Duong et al. | |
| 7,870,722 B2 | 1/2011 | Birch et al. | |
| 7,926,260 B2 | 4/2011 | Sheridan et al. | |
| 7,950,237 B2 | 5/2011 | Grabowski et al. | |
| 7,997,868 B1 | 8/2011 | Liang et al. | |
| 8,205,432 B2 | 6/2012 | Sheridan | |
| 8,997,497 B2 | 4/2015 | Hall et al. | |
| 2002/0069637 A1 | 6/2002 | Becquerelle | |
| 2003/0163984 A1 | 9/2003 | Seda et al. | |
| 2005/0229585 A1 | 10/2005 | Webster | |
| 2005/0286823 A1 | 12/2005 | Singh et al. | |
| 2006/0101807 A1 | 5/2006 | Wood et al. | |
| 2006/0179818 A1 | 8/2006 | Merchant | |
| 2006/0228206 A1 | 10/2006 | Decker et al. | |
| 2008/0003096 A1 | 1/2008 | Kohli et al. | |
| 2008/0010929 A1 | 1/2008 | Moriau et al. | |
| 2008/0010969 A1 | 1/2008 | Hauer et al. | |
| 2008/0098716 A1 | 5/2008 | Orlando et al. | |
| 2008/0116009 A1 | 5/2008 | Sheridan et al. | |
| 2008/0317588 A1 | 12/2008 | Grabowski et al. | |
| 2009/0053058 A1 | 2/2009 | Kohlnberg et al. | |
| 2009/0056343 A1 | 3/2009 | Suciu et al. | |
| 2009/0097967 A1 | 4/2009 | Smith et al. | |
| 2009/0208328 A1 | 8/2009 | Stern | |
| 2009/0226303 A1 | 9/2009 | Grabowski et al. | |
| 2009/0277155 A1 | 11/2009 | Bulin et al. | |
| 2009/0320488 A1 | 12/2009 | Gilson et al. | |
| 2010/0008764 A1 | 1/2010 | Baltas et al. | |
| 2010/0043393 A1 | 2/2010 | Zamora et al. | |
| 2010/0044503 A1 | 2/2010 | Bulin et al. | |
| 2010/0064659 A1 | 3/2010 | Wang | |
| 2010/0105516 A1 | 4/2010 | Sheridan et al. | |
| 2010/0148396 A1 | 6/2010 | Xie et al. | |
| 2010/0212281 A1 | 8/2010 | Sheridan | |
| 2010/0218483 A1 | 9/2010 | Smith | |
| 2010/0331139 A1 | 12/2010 | McCune | |

(56) References Cited

U.S. PATENT DOCUMENTS

| | | |
|---|---|---|
| 2011/0004388 A1 | 1/2011 | Winter |
| 2011/0120078 A1 | 5/2011 | Schwark, Jr. et al. |
| 2011/0120080 A1 | 5/2011 | Schwark, Jr. et al. |
| 2011/0159797 A1 | 6/2011 | Beltman et al. |
| 2011/0293423 A1 | 12/2011 | Bunker et al. |
| 2011/0296813 A1 | 12/2011 | Frank et al. |
| 2011/0302907 A1 | 12/2011 | Murphy |
| 2012/0124964 A1 | 5/2012 | Hasel et al. |

FOREIGN PATENT DOCUMENTS

| | | |
|---|---|---|
| EP | 1340903 | 9/2003 |
| EP | 1522710 | 4/2005 |
| EP | 1967701 | 9/2008 |
| EP | 2028359 | 2/2009 |
| EP | 2138696 | 12/2009 |
| EP | 2157305 | 2/2010 |
| EP | 2184480 | 5/2010 |
| EP | 2282016 | 2/2011 |
| EP | 2584184 | 4/2013 |
| FR | 1503425 | 3/1978 |
| GB | 1516041 | 6/1978 |
| GB | 2041090 | 9/1980 |
| GB | 2189550 | 10/1987 |
| GB | 2426792 | 12/2006 |
| WO | 2007038674 | 4/2007 |
| WO | 2008/045049 | 4/2008 |
| WO | 2008/045058 | 4/2008 |

OTHER PUBLICATIONS

Kurzke, J. (2009). Fundamental differences between conventional and geared turbofans. Proceedings of ASME Turbo Expo: Power for Land, Sea, and Air. 2009, Orlando, Florida. pp. 145-153.

Agarwal, B.D and Broutman, L.J. (1990). Analysis and performance of fiber composites, 2nd Edition. John Wiley & Sons, Inc. New York: New York. pp. 1-30, 50-51, 56-58, 60-61, 64-71, 87-89, 324-329, 436-437.

Carney, K., Pereira, M. Revilock, and Matheny, P. (2003). Jet engine fan blade containment using two alternate geometries. 4th European LS-DYNA Users Conference. pp. 1-10.

Brines, G.L. (1990). The turbofan of tomorrow. Mechanical Engineering: The Journal of the American Society of Mechanical Engineers,108(8), 65-67.

Faghri, A. (1995). Heat pipe and science technology. Washington, D.C.: Taylor & Francis. pp. 1-60.

Hess, C. (1998). Pratt & Whitney develops geared turbofan. Flug Revue 43(7). Oct. 1998.

Grady, J.E., Weir, D.S., Lamoureux, M.C., and Martinez, M.M. (2007). Engine noise research in NASA's quiet aircraft technology project. Papers from the International Symposium on Air Breathing Engines (ISABE). 2007.

Griffiths, B. (2005). Composite fan blade containment case. Modern Machine Shop. Retrieved from: http://www.mmsonline.com/articles/composite-fan-blade-containment-case pp. 1-4.

Hall, C.A. and Crichton, D. (2007). Engine design studies for a silent aircraft. Journal of Turbomachinery, 129, 479-487.

Haque, A. and Shamsuzzoha, M., Hussain, F., and Dean, D. (2003). S20-glass/epoxy polymer nanocomposites: Manufacturing, structures, thermal and mechanical properties. Journal of Composite Materials, 37 (20), 1821-1837.

Brennan, P.J. and Kroliczek, E.J. (1979). Heat pipe design handbook. Prepared for National Aeronautics and Space Administration by B & K Engineering, Inc. Jun. 1979. pp. 1-348.

Horikoshi, S. and Serpone, N. (2013). Introduction to nanoparticles. Microwaves in nanoparticle synthesis. Wiley-VCH Verlag GmbH & Co. KGaA. pp. 1-24.

Kerrebrock, J.L. (1977). Aircraft engines and gas turbines. Cambridge, MA: The MIT Press. p. 11.

Xie, M. (2008). Intelligent engine systems: Smart case system. NASA/CR-2008-215233. pp. 1-31.

Knip, Jr., G. (1987). Analysis of an advanced technology subsonic turbofan incorporating revolutionary materials. NASA Technical Memorandum. May 1987. pp. 1-23.

Willis, W.S. (1979). Quiet clean short-haul experimental engine (QCSEE) final report. NASA/CR-159473 pp. 1-289.

Kojima, Y., Usuki, A. Kawasumi, M., Okada, A., Fukushim, Y., Kurauchi, T., and Kamigaito, O. (1992). Mechanical properties of nylon 6-clay hybrid. Journal of Materials Research, 8(5), 1185-1189.

Kollar, L.P. and Springer, G.S. (2003). Mechanics of composite structures. Cambridge, UK: Cambridge University Press. p. 465.

Ramsden, J.M. (Ed). (1978). The new European airliner. Flight International, 113(3590). Jan. 7, 1978. pp. 39-43.

Langston, L. and Faghri, A. Heat pipe turbine vane cooling. Prepared for Advanced Turbine Systems Annual Program Review. Morgantown, West Virginia. Oct. 17-19, 1995. pp. 3-9.

Oates, G.C. (Ed). (1989). Aircraft propulsion systems and technology and design. Washington, D.C.: American Institute of Aeronautics, Inc. pp. 341-344.

Lau, K., Gu, C., and Hui, D. (2005). A critical review on nanotube and nanotube/nanoclay related polymer composite materials. Composites: Part B 37(2006) 425-436.

Shorter Oxford English dictionary, 6th Edition. (2007). vol. 2, N-Z. p. 1888.

Lynwander, P. (1983). Gear drive systems: Design and application. New York, New York: Marcel Dekker, Inc. pp. 145, 355-358.

Sweetman, B. and Sutton, O. (1998). Pratt & Whitney's surprise leap. Interavia Business & Technology, 53.621, p. 25.

Mattingly, J.D. (1996). Elements of gas turbine propulsion. New York, New York: McGraw-Hill, Inc. pp. 8-15.

Pyrograf-III Carbon Nanofiber. Product guide. Retrieved Dec. 1, 2015 from: http://pyrografproducts.com/Merchant5/merchant.mvc?Screen=cp_nanofiber.

Nanocor Technical Data for Epoxy Nanocomposites using Nanomer 1.30E Nanoclay. Nnacor, Inc. Oct. 2004.

Ratna, D. (2009). Handbook of thermoset resins. Shawbury, UK: iSmithers. pp. 187-216.

Wendus, B.E., Stark, D.F., Holler, R.P., and Funkhouser, M.E. (2003). Follow-on technology requirement study for advanced subsonic transport. NASA/CR-2003-212467. pp. 1-37.

Silverstein, C.C., Gottschlich, J.M., and Meininger, M. The feasibility of heat pipe turbine vane cooling. Presented at the International Gas Turbine and Aeroengine Congress and Exposition, The Hague, Netherlands. Jun. 13-16, 1994.pp. 1-7.

Merriam-Webster's collegiate dictionary, 11th Ed. (2009). p. 824.

Merriam-Webster's collegiate dictionary, 10th Ed. (2001). p. 1125-1126.

Whitaker, R. (1982). ALF 502: plugging the turbofan gap. Flight International, p. 237-241, Jan. 30, 1982.

Hughes, C. (2010). Geared turbofan technology. NASA Environmentally Responsible Aviation Project. Green Aviation Summit. NASA Ames Research Center. Sep. 8-9, 2010. pp. 1-8.

Gliebe, P.R. and Janardan, B.A. (2003). Ultra-high bypass engine aeroacoustic study. NASA/CR-2003-21252. GE Aircraft Engines, Cincinnati, Ohio. Oct. 2003. pp. 1-103.

Moxon, J. How to save fuel in tomorrow's engines. Flight International. Jul. 30, 1983. 3873(124). pp. 272-273.

File History for U.S. Appl. No. 12/131,876.

Cusick, M. (1981). Avco Lycoming's ALF 502 high bypass fan engine. Society of Automotive Engineers, inc. Business Aircraft Meeting & Exposition. Wichita, Kansas. Apr. 7-10, 1981. pp. 1-9.

Fledderjohn, K.R. (1983). The TFE731-5: Evolution of a decade of business jet service. SAE Technical Paper Series. Business Aircraft Meeting & Exposition. Wichita, Kansas. Apr. 12-15, 1983. pp. 1-12.

Dickey, T.A. and Dobak, E.R. (1972). The evolution and development status of ALF 502 turbofan engine. National Aerospace Engineering and Manufacturing Meeting. San Diego, California. Oct. 2-5, 1972. pp. 1-12.

Gunston, B. (Ed.) (2000). Jane's aero-engines, Issue seven. Coulsdon, Surrey, UK: Jane's Information Group Limited. pp. 510-512.

(56) References Cited

OTHER PUBLICATIONS

Ivchenko-Progress D-436. Jane's Aero-engines, Aero-engines—Turbofan. Feb. 8, 2012.
Ivchenko-Progress AI-727M. Jane's Aero-engines, Aero-engines—Turbofan. Nov. 27, 2011.
Ivchenko-Progress D-727. Jane's Aero-engines, Aero-engines—Turbofan. Feb. 7, 2007.
Turbomeca Aubisque. Jane's Aero-engines, Aero-engines—Turbofan. Nov. 2, 2009.
Aviadvigatel D-110. Jane's Aero-engines, Aero-engines—Turbofan. Jun. 1, 2010.
Rolls-Royce M45H. Jane's Aero-engines, Aero-engines—Turbofan. Feb. 24, 2010.
Honeywell LF502. Jane's Aero-engines, Aero-engines—Turbofan. Feb. 9, 2012.
Davies, D. and Miller, D.C. (1971). A variable pitch fan for an ultra quiet demonstrator engine. 1976 Spring Convention: Seeds for Success in Civil Aircraft Design in the Next Two Decades. pp. 1-18.
Middleton, P. (1971). 614: VFW's jet feederliner. Flight International, Nov. 4, 1971. p. 725, 729-732.
Schaefer, J.W., Sagerser, D.R., and Stakolich, E.G. (1977). Dynamics of high-bypass-engine thrust reversal using a variable-pitch fan. Technical Report prepare for NASA. NASA-TM-X-3524. May 1, 1977. pp. 1-33.
Savelle, S.A. and Garrard, G.D. (1996). Application of transient and dynamic simulations to the U.S. Army T55-L-712 helicopter engine. The American Society of Mechanical Engineers. Presented Jun. 10-13, 1996. pp. 1-8.
Drago, R.J. and Margasahayam, R.N. (1987). Stress analysis of planet gears with integral bearings; 3D finite-element model development and test validation. 1987 MSC NASTRAN World Users Conference. Los Angeles, CA. Mar. 1987. pp. 1-14.
Baker, R.W. (2000). Membrane technology and applications. New York, NY: McGraw-Hill. pp. 87-153.
Cheryan, M. (1998). Ultrafiltration and microfiltration handbook. Lancaster, PA: Tecnomic Publishing Company, Inc. pp. 171-236.
Seader, J.D. and Henley, E.J. (1998). Separation process principles. New York, NY: John Wiley & Sons, Inc. pp. 722-726 and 764-771.
Spadaccini, L.J., and Huang, H. (2002). On-line fuel deoxygenation for coke suppression. ASME, Jun. 2002. pp. 1-7.
Darrah, S. (1987). Jet fuel deoxygenation. Interim Report for Period Mar. 1987-Jul. 1988. pp. 1-22.
Bucknell, R.L. (1973). Influence of fuels and lubricants on turbine engine design and performance, fuel and lubricant analyses. Final Technical Report, Mar. 1971-Mar. 1973. pp. 1-252.
Hazlett, R.N. (1991). Thermal oxidation stability of aviation turbine fuels. Philadelphia, PA: ASTM. pp. 1-163.
Taylor, W.F. (1974). Deposit formation from deoxygenated hydrocarbons. I. General features. Ind. Eng. Chem., Prod. Res. Develop., vol. 13(2). 1974. pp. 133-138.
Taylor, W.F. (1974). Deposit formation from deoxygenated hydrocarbons. II. Effect of trace sulfur compounds. Ind. Eng. Chem., Prod. Res. Dev., vol. 15(1). 1974. pp. 64-68.
Taylor, W.F. and Frankenfeld, J.W. (1978). Deposit fromation from deoxygenated hydrocarbons. 3. Effects of trace nitrogen and oxygen compounds. Ind. Eng. Chem., Prod. Res. Dev., vol. 17(1). 1978. pp. 86-90.
Frankenfeld, J.W. and Taylor, W.F. (1980). Deposit fromation from deoxygenated hydrocarbons. 4. Studies in pure compound systems. Ind. Eng. Chem., Prod. Res. Dev., vol. 19(1). 1978. pp. 65-70.
Hemighaus, G., Boval, T., Bacha, J., Barnes, F., Franklin, M., Gibbs, L., . . . Morris, J. (2007). Aviation fuels: Techincal review. Chevron Products Company. pp. 1-94. Retrieved from: https://www.cgabusinessdesk.com/document/aviation_tech_review.pdf.
Spadaccini, L.J., Sobel, D.R., and Huang, H. (2001). Deposit formation and mitigation in aircraft fuels. Journal of Eng. For Gas Turbine and Power, vol. 123. Oct. 2001. pp. 741-746.
Edwards, T. and Zabarnick, S. (1993). Supercritical fuel deposition mechanisms. Ind. Eng. Chem. Res. vol. 32. 1993. pp. 3117-3122.

Huang, H., Sobel, D.R., and Spadaccini, L.J. (2002). Endothermic heat-sink of hydrocarbon fuels for scramjet cooling. AIAA/ASME/SAE/ASEE, Jul. 2002. pp. 1-7.
Bessarabov, D.G., Jacobs, E.P., Sanderson, R.D., and Beckman, I.N. (1996). Use of nonporous polymeric flat-sheet gas-separation membranes in a membrane-liquid contactor: experimental studies. Journal of Membrane Sciences, vol. 113. 1996. pp. 275-284.
Matsumoto, T., Toshiro, U., Kishida, A., Tsutomu, F., Maruyama, I., and Akashi, M. (1996). Novel functional polymers: Poly (dimethylsiloxane)-polyamide multiblock copolymer. VII. Oxygen permeability of aramid-silicone membranes in a gas-membrane-liquid system. Journal of Applied Polymer Science, vol. 64(6). May 9, 1997. pp. 1153-1159.
Technical Data. Teflon. WS Hampshire Inc. Retrieved from: http://catalog.wshampshire.com/Asset/psg_teflon_ptfe.pdf.
Anderson, N.E., Loewenthal, S.H., and Black, J.D. (1984). An analytical method to predict efficiency of aircraft gearboxes. NASA Technical Memorandum prepared for the Twentieth Joint Propulsion Conference. Cincinnati, OH. Jun. 11-13, 1984. pp. 1-25.
Edkins, D.P., Hirschkron, R., and Lee, R. (1972). TF34 turbofan quiet engine study. Final Report prepared for NASA. NASA-CR-120914. Jan. 1, 1972. pp. 1-99.
Waters, M.H. and Schairer, E.T. (1977). Analysis of turbofan propulsion system weight and dimensions. NASA Technical Memorandum. Jan. 1977. pp. 1-65.
Meyer, A.G. (1988). Transmission development of TEXTRON Lycoming's geared fan engine. Technical Paper. Oct. 1988. pp. 1-12.
Dudley, D.W., Ed. (1962). Gear handbook. New York, NY: McGraw-Hill. pp. 14-17 (TOC, Preface, and Index).
Hughes, C. (2002). Aerodynamic performance of scale-model turbofan outlet guide vanes designed for low noise. Prepared for the 40th Aerospace Sciences Meeting and Exhibit. Reno, NV. NASA/TM-2001-211352. Jan. 14-17, 2002. pp. 1-38.
Kaplan, B., Nicke, E., Voss, C. (2006), Design of a highly efficient low-noise fan for ultra-high bypass engines. Proceedings of GT2006 for ASME Turbo Expo 2006: Power for Land, Sea and Air. Barcelona, SP. May 8-11, 2006. pp. 1-10.
Gates, D. Bombardier flies at higher market. Seattle Times. Jul. 13, 2008. pp. C6.
Decker, S. and Clough, R. (2016). GE wins shot at voiding pratt patent in jet-engine clash. Bloomberg Technology. Retrieved from: https://www.bloomberg.com/news/articles/2016-06-30/ge-wins-shot-to-invalidate-pratt-airplane-engine-patent-in-u-s.
Trembley, Jr., H.F. (1977). Determination of effects of ambient conditions on aircraft engine emissions. ALF 502 combustor rig testing and engine verification test. Prepared for Environmental Protection Agency. Sep. 1977. pp. 1-256.
Lewicki, D.G., Black, J.D., Savage, M., and Coy, J.J. (1985). Fatigue life analysis of a turboprop reduction gearbox. NASA Technical Memorandum. Prepared for the Design Technical Conference (ASME). Sep. 11-13, 1985. pp. 1-26.
McCune, M.E. (1993). Initial test results of 40,000 horsepower fan drive gear system for advanced ducted propulsion systems. AIAA 29th Joint Conference and Exhibit. Jun. 28-30, 1993. pp. 1-10.
Wright, G.H. and Russell, J.G. (1990). The M.45SD-02 variable pitch geared fan engine demonstrator test and evaluation experience. Aeronautical Journal., vol. 84(836). Sep. 1980. pp. 268-277.
Drago, R.J. (1974). Heavy-lift helicopter brings up drive ideas. Power Transmission Design. Mar. 1987. pp. 1-15.
Krantz, T.L. (1990). Experimental and analytical evaluation of efficiency of helicopter planetary stage. NASA Technical Paper. Nov. 1990. pp. 1-19.
Heingartner, P., Mba, D., Brown, D. (2003). Determining power losses in the helical gear mesh; Case Study. ASME 2003 Design Engineering Technical Conferences. Chicago, IL. Sep. 2-6, 2003. pp. 1-7.
Thulin, R.D., Howe, D.C., and Singer, I.D. (1982). Energy efficient engine: High pressure turbine detailed design report. Prepared for NASA. NASA CR-165608. Received Aug. 9, 1984. pp. 1-178.
Munt, R. (1981). Aircraft technology assessment: Progress in low emissions engine. Technical Report. May 1981. pp. 1-171.

(56) References Cited

OTHER PUBLICATIONS

Avco Lycoming Divison. ALF 502L Maintenance Manual. Apr. 1981. pp. 1-118.
Type Certificate Data Sheet No. E6NE. Department of Transportation Federal Aviation Administration. Jun. 7, 2002. pp. 1-10.
Trembley, Jr., H.F. (1977). Determination of effects of ambient conditions on aircraft engine emissions. Prepared for Environmental Protection Agency. Ann Arbor, Michigan. Sep. 1977 pp. 1-256.
Honeywell LF502. Jane's Aero-engines, Aero-engines—Turbofan. Aug. 17, 2016.
Rauch, D. (1972). Design study of an air pump and integral lift engine ALF-504 using the Lycoming 502 core. Prepare for NASA. Jul. 1972. pp. 1-182.
Dassault Falcon 900EX Easy Systems Summary. Retrieved from: http://www.smartcockpit.com/docs/F900EX-Engines.pdf pp. 1-31.
Honeywell TFE731 Pilot Tips. pp. 1-143.
Honeywell TFE731-5AR to -5BR Engine Conversion Program. Sep. 2005. pp. 1-4.
Garret TFE731 Turbofan Engine (CAT C). Chapter 79: Lubrciation System. TTFE731 Issue 2. 2010. pp. 1-24.
McArdle, J.G. (1979). Static test-stand performance of the YF-102 turbofan engine with several exhaust configurations for the quiet short-haul research aircraft (QSRA). Nasa Technical Paper. Nov. 1979. pp. 1-68.
International Search Report and Written Opinion for International Application No. PCT/US2012/071937 completed on Aug. 16, 2013.
International Search Report and Written Opinion for International Application No. PCT/US2012/071946 completed on Aug. 21, 2013.
International Search Report and Written Opinion for International Application No. PCT/US2012/071928 completed on Aug. 20, 2013.
Guha. Optimum Fan Pressure Ratio for Bypass Engines with Separate or Mixed Exhaust Streams. Journal of Propulsion and Power, vol. 17, No. 5. Sep.-Oct. 2001 [retrieved on Aug. 21, 2013]. Retrieved from the Internet: <URL: http://www.facweb.iitkgp,ernet.in/~aguha/research/AIAA2001.pdf>entire document.
Boggia, S. et al., Intercooled Recuperated Gas Turbine Engine Concept, AIAA 2005-4192, 2005, pp. 1-11.
Search Report and Written Opinion for Singapore Application No. 11201403587S dated Mar. 10, 2015.
Search Report and Written Opinion for Singapore Application No. 11201403586Q dated Mar. 10, 2015.
Search Report and Written Opinion for Singapore Application No. 11201403544T dated Mar. 19, 2015.
Search Report and Written Opinion for Singapore Application No. 11201403545S dated Mar. 19, 2015.
Jacobs, Eastman N., "The Characteristics of 78 Related Airfoil Sections from Tests in the Variable-Density Wind Tunnel," National Advisory Committee for Aeronautics, Nov. 1933, pp. 2-61.
International Search Report & Written Opinion for International Application No. PCT/US2012/068336 dated Jun. 27, 2013.
International Search Report & Written Opinion for International Application No. PCT/US2012/071954 dated Jul. 29, 2013.
International Preliminary Report on Patentability for International Application No. PCT/US2012/068336 dated Jun. 19, 2014.
International Preliminary Report on Patentability for International Application No. PCT/US2012/071928 dated Jul. 10, 2014.
International Preliminary Report on Patentability for International Application No. PCT/US2012/071937 dated Jul. 10, 2014.
International Preliminary Report on Patentability for International Application No. PCT/US2012/071946 dated Jul. 10, 2014.
International Preliminary Report on Patentability for International Application No. PCT/US2012/071954 dated Jul. 10, 2014.
European Search Report for EP Application No. 12872986.0 dated Jun. 22, 2015.
European Search Report for EP Application No. 12871743.6 dated Jul. 14, 2015.
European Search Report for EP Application No. 12869088.0 dated Jul. 23, 2015.
European Search Report for EP Application No. 12872220.4 dated Jul. 22, 2015.
European Search Report for EP Application No. 12871636.2 dated Jul. 23, 2015.
Search Report and Written Opinion for Singapore Application No. 11201402854V dated Oct. 2, 2015.
Petition for Inter Partes Review of U.S. Pat. No. 8,511,605, Claims 1-6 and 12-16. *General Electric Company*, Petitioner v. *United Technologies Corporation*, Patent Owner. Filed Jan. 29, 2016. pp. 1-43.
Petition for Inter Partes Review of U.S. Pat. No. 8,511,605, Claims 1,2, and 7-11. *General Electric Company*, Petitioner v. *United Technologies Corporation*, Patent Owner. Filed Jan. 29, 2016. pp. 1-43.
Decision Institution of Inter Partes Review. *General Electric Co.*, Petitioner, v. *United Technologies Corp.*, Patent Owner. IPR2016-00531. U.S. Pat. No. 8,511,605. Entered Jun. 30, 2016. pp. 1-16.
Petition for Inter Partes Review of U.S. Pat. No. 8,365,513. *General Electric Company*, Petitioner v. *United Technologies Corporation*, Patent Owner. Filed Jan. 29, 2016. pp. 1-61.
Decision Institution of Inter Partes Review. *General Electric Co.*, Petitioner, v. *United Technologies Corp.*, Patent Owner. IPR2016-00534. U.S. Pat. No. 8,365,513. Entered Aug. 12, 2016. pp. 1-27.
Declaration of Magdy Attia, Ph.D in connection with the petition for inter partes review for U.S. Pat. No. 8,365,513 executed Jan. 17, 2016. pp. 1-74.
Adams, Eric. The worlds hugest jet engine is wider than a 737's fuselage. Retrieved Apr. 28, 2016 from: www.wired.com/2016/04/worlds-hugest-jet-engine-wider-737s-fuselage/ accessed.
Warwick, G. (2007). Civil engines: Pratt & Whitney gears up for the future with GTF. Flight International, Nov. 2007. Retrieved Jun. 14, 2016 from: https://www.flightglobal.com/news/articles/civil-engines-pratt-amp-whitney-gears-up-for-the-future-with-219989/.
Coy, Peter. The little gear that could reshape the jet engine: A simple idea's almost 30-year, $10 billion journey oto the aircraft mainstream. Bloomberg Business. Oct. 15, 2015. p. 1-4.
Read, B. (2014). Powerplant revolution. AeroSpace. May 2014. pp. 28-31.
Kjelgaard, C. (2010). Gear up for the GTF. Aircraft Technology, 105. Apr.-May 2010. pp. 86, 88, 90, 92-95.
Lord, W.K. (2000). P&W expectations. Quiet Aircraft Technology Workshop, Dallas, TX. Apr. 11-12, 2000. pp. 1-7.
Final Written Decision *General Electric Company.*, Petitioner, v. *United Technologies Corp.*, Patent Owner. IPR2016-00534. U.S. Pat. No. 8,365,513. Entered Aug. 3, 2017. pp. 1-42.
Gunston, B. (Ed) (2000). Jane's aero-engines. Issue Seven. Janes Information Group Inc. Alexandria, Virgina. pp. 1-47, 61, 464-512.
Decision Institution of Inter Partes Review. *General Electric Co.*, Petitioner, v. *United Technologies Corp.*, Patent Owner. IPR2016-00533. U.S. Pat. No. 8,511,605. Entered Jun. 30, 2016. pp. 1-19.
Honeywell LF507. Jane's Aero-engines, Aero-engines—Turbofan. Feb. 9, 2012.
Honeywell TFE731. Jane's Aero-engines, Aero-engines—Turbofan. Jul. 18, 2012.
NASA Conference Publication. Quiet, powered-lift propulsion. Cleveland, Ohio. Nov. 14-15, 1978. pp. 1-420.
"Civil Turbojet/Turbofan Specifications", Jet Engine Specification Database (Apr. 3, 2005).
Kandebo, S.W. (1993). Geared-turbofan engine design targets cost, complexity. Aviation Week & Space Technology, 148(8). Start p. 32.
Hendricks, E.S. and Tong, M.T. (2012). Performance and weight estimates for an advanced open rotor engine. NASA/TM-2012-217710. pp. 1-13.
Guynn, M. D., Berton, J.J., Fisher, K. L., Haller, W.J., Tong, M. T., and Thurman, D.R. (2011). Refined exploration of turbofan design options for an advanced single-aisle transport. NASA/TM-2011-216883. pp. 1-27.
Zalud, T. (1998). Gears put a new spin on turbofan performance. Machine Design, 70(20), p. 104.
Kurzke, J. (2008). Preliminary Design, Aero-engine design: From state of the art turbofans towards innovative architectures. pp. 1-72.
Zamboni, G. and Xu, L. (2009). Fan root aerodynamics for large bypass gas turbine engines: Influence on the engine performance

(56) References Cited

OTHER PUBLICATIONS and 3D design. Proceedings of ASME Turbo Expo 2009: Power for Land, Sea and Air. Jun. 8-12, 2009, Orlando, Florida, USA. pp. 1-12.

Han, J., Dutta, S., and Ekkad, S.V. (2000). Gas turbine heat transfer and cooling technology. New York, NY: Taylor & Francis. pp. 1-25, 129-157, and 160-249.

Mattingly, J.D. (1996). Elements of gas turbine propulsion. New York, New York: McGraw-Hill, Inc. pp. 1-18, 60-62, 85-87, 95-104, 121-123, 223-234, 242-245, 278-280, 303-309, 323-326, 462-479, 517-520, 563-565, 673-675, 682-685, 697-699, 703-705, 802-805, 862-864, and 923-925.

Declaration of Reza Abhari, Ph.D. In re U.S. Pat. No. 8,844,265. Executed Jun. 28, 2016. pp. 1-91.

Declaration of John Eaton, Ph.D. In re U.S. Pat. No. 8,869,568. Executed Mar. 28, 2016. pp. 1-87.

Declaration of Reza Abhari. In re U.S. Pat. No. 8,695,920. Executed Nov. 30. pp. 1-67.

Declaration of Reza Abhari. In re U.S. Pat. No. 8,448,895. Executed Nov. 28. pp. 1-81.

Declaration of Reza Abhari. In re U.S. Pat. No. 8,695,920, claims 1-4, 7-14, 17 and 19. Executed Nov. 29. pp. 1-102.

Declaration of Dr. Magdy Attia. In re U.S. Pat. No. 8,313,280. Executed Oct. 21, 2016. pp. 1-88.

Lord, W.K., MacMartin, D.G., and Tillman, T.G. (2000). Flow control opportunities in gas turbine engines. American Institute of Aeronautics and Astronautics. pp. 1-15.

Daly, M. Ed. (2010). Jane's Aero-Engine. Issue Twenty-seven. Mar. 2010. p. 633-636.

Roux, E. (2007). Turbofan and turbojet engines database handbook. Editions Elodie Roux. Blagnac: France. pp. 1-595.

Wilfert, G. (2008). Geared fan. Aero-Engine Design: From State of the Art Turbofans Towards Innovative Architectures, von Karman Institute for Fluid Dynamics, Belgium, Mar. 3-7, 2008. pp. 1-26.

Declaration of Dr. Magdy Attia. In re U.S. Pat. No. 8,517,668. Executed Dec. 8, 2016. pp. 1-81.

Cramoisi, G. Ed. (2012). Death in the Potomac: The crash of Air Florida Flight 90. Air Crash Investigations. Accident Report NTSB/AAR-82-8. p. 45-47.

Norton, M. and Karczub, D. (2003). Fundamentals of noise and vibration analysis for engineers. Press Syndicate of the University of Cambridge. New York: New York. p. 524.

U.S. Department of Transportation: Federal Aviation Administration Advisory Circular. Runway overrun prevention. Dated: Nov. 6, 2007. p. 1-8 and Appendix 1 p. 1-15, Appendix 2 p. 1-6, Appendix 3 p. 1-3, and Appendix 4 p. 1-5.

U.S. Department of Transportation: Federal Aviation Administration Advisory Circular. Standard operating procedures for flight deck crewmembers. Dated: Feb. 27, 2003 . . . p. 1-6 and Appendices.

Vasudevan, A.K. and Petrovic, J.J. (1992). A comparative overview of molybedenum disilicide composites. Materials Science and Engineering, A155, 1992. pp. 1-17.

Clarke, D.R. and Levi, C.G. (2003). Materials design for the next generation thermal barrier coatings. Annual. Rev. Mater. Res. vol. 33. 2003. pp. 383-417.

Lee, K.N. (2000). Current status of environmental barrier coatings for Si-Based ceramics. Surface and Coatings Technology 133-134, 2000. pp. 1-7.

Bornstein, N. (1993). Oxidation of advanced intermetallic compounds. Journal de Physique IV, 1993, 03 (C9), pp. C9-367-C9-373.

Krenkel, W., Naslain, R., and Schneider, H. Eds. (2001). High temperature ceramic matrix composites pp. 224-229. Weinheim, DE: Wiley-VCH Verlag GmbH.

Gibala, R., Ghosh, A.K., Van Aken, D.C., Srolovitz, D.J., Basu, A., Chang, H., . . . Yang, W. (1992). Mechanical behavior and interface design of MoSi2-based alloys and composites. Materials Science and Engineering, A155, 1992. pp. 147-158.

Shah, D.M. (1992). MoSi2 and other silicides as high temperature structural materials. Superalloys 1992. The Minerals, Metals, & Materials Society. pp. 409-422.

Zhao, J.C. and Westbrook, J.H. (2003). Ultrahigh-temperature materials for jet engines. MRS Bulletin. vol. 28 (9). Sep. 2003. pp. 622-630.

Tsirlin, M., Pronin, Y.E., Florina, E.K., Mukhametov, S. Kh., Khatsernov, M.A., Yun, H.M., . . . Kroke, E. (2001). Experimental investigation of multifunctional interphase coatings on SiC fibers for non-oxide high temperature resistant CMCs. High Temperature Ceramic Matrix Composites. 4th Int'l Conf. on High Temp. Ceramic Matrix Composites. Oct. 1-3, 2001. pp. 149-156.

Jacobson, N.S. (1993). Corrosion of silicon-based ceramics in combustion environments. J. Am. Ceram. Soc. 76 (1). pp. 3-28.

Jorgensen, P.J., Wadsworth, M.E., and Cutler, I.B. (1961). Effects of water vapor on oxidation of silicon carbide. J. Am. Ceram. Soc. 44(6). pp. 248-261.

Xu, Y., Cheng, L., Zhang, L., Ying, H., and Zhou, W. (1999). Oxidation behavior and mechanical properties of C/SiC composites with Si—MoSi2 oxidation protection coating. J. of Mat. Sci. vol. 34. 1999. pp. 6009-6014.

Sundaram, S.K., Hsu, J-Y., Speyer, R.F. (1995). Molten glass corrosion resistance of immersed combustion-heating tube materials in e-glass. J. Am. Ceram. Soc. 78(7). pp. 1940-1946.

Jeng, Y.-L., Lavernia, E.J. (1994). Processing of molybdenum disilicide. J. of Mat. Sci. vol. 29. 1994. pp. 2557-2571.

Suzuki, Y., Morgan, P.E.D., and Niihara, K. (1998). Improvement in mechanical properties of powder-processed MoSi2 by the addition of Sc2O3 and Y2O3. J. Am. Ceram. Soci. 81(12). pp. 3141-3149.

Webster, J.D., Westwood, M.E., Hayes, F.H., Day, R.J., Taylor, R., Duran, A., . . . Vogel, W.D. (1998). Oxidation protection coatings for C/SiC based on yttrium silicate. Journal of European Ceramic Society vol. 18. 1998. pp. 2345-2350.

Petrovic, J.J., Castro, R.G., Vaidya, R.U., Peters, M.I., Mendoza, D., Hoover, R.C., and Gallegos, D. E. (2001). Molybdenum disilicide materials for glass melting sensor sheaths. Ceramic Engineering and Science Proceedings. vol. 22(3). 2001. pp. 59-64.

Kahn, H., Tayebi, N., Ballarini, R., Mullen, R.L., Heuer, A.H. (2000). Fracture toughness of polysilicon MEMS devices. Sensors and Actuators vol. 82. 2000. pp. 274-280.

Muhlstein, C.L., Stach, E.A., and Ritchie, R.O. (2002). A reaction-layer mechanism for the delayed failure of micron-scale polycrystalline silicon structural films subjected to high-cycle fatigue loading. Acta Materialia vol. 50. 2002. pp. 3579-3595.

Sundaram, S.K., Hsu, J-Y., Speyer, R.F. (1994). Molten glass corrosion resistance of immersed combustion-heating tube materials in soda-lime-silicate glass. J. Am. Ceram. Soc. 77(6). pp. 1613-1623.

Leckie, F.A. and Dal Bello, D.J. (2009). Strength and stiffness of engineering systems. Mechanical Engineering Series. Springer. pp. 1-3.

El-Sayad, A.F. (2008). Aircraft propulsion and gas turbine engines. Boca Raton, FL: CRC Press. pp. 215-219 and 855-860.

Bunker, R.S. (2005). A review of shaped hole turbine film-cooling technology. Journal of Heat Transfer vol. 127. Apr. 2005. pp. 441-453.

Final Written Decision. U.S. Pat. No. 8,313,280. *General Electric Company*, Petitioner, v. *United Technologies Corporation*, Patent Owner. IPR2017-00427. Entered Jul. 3, 2018.

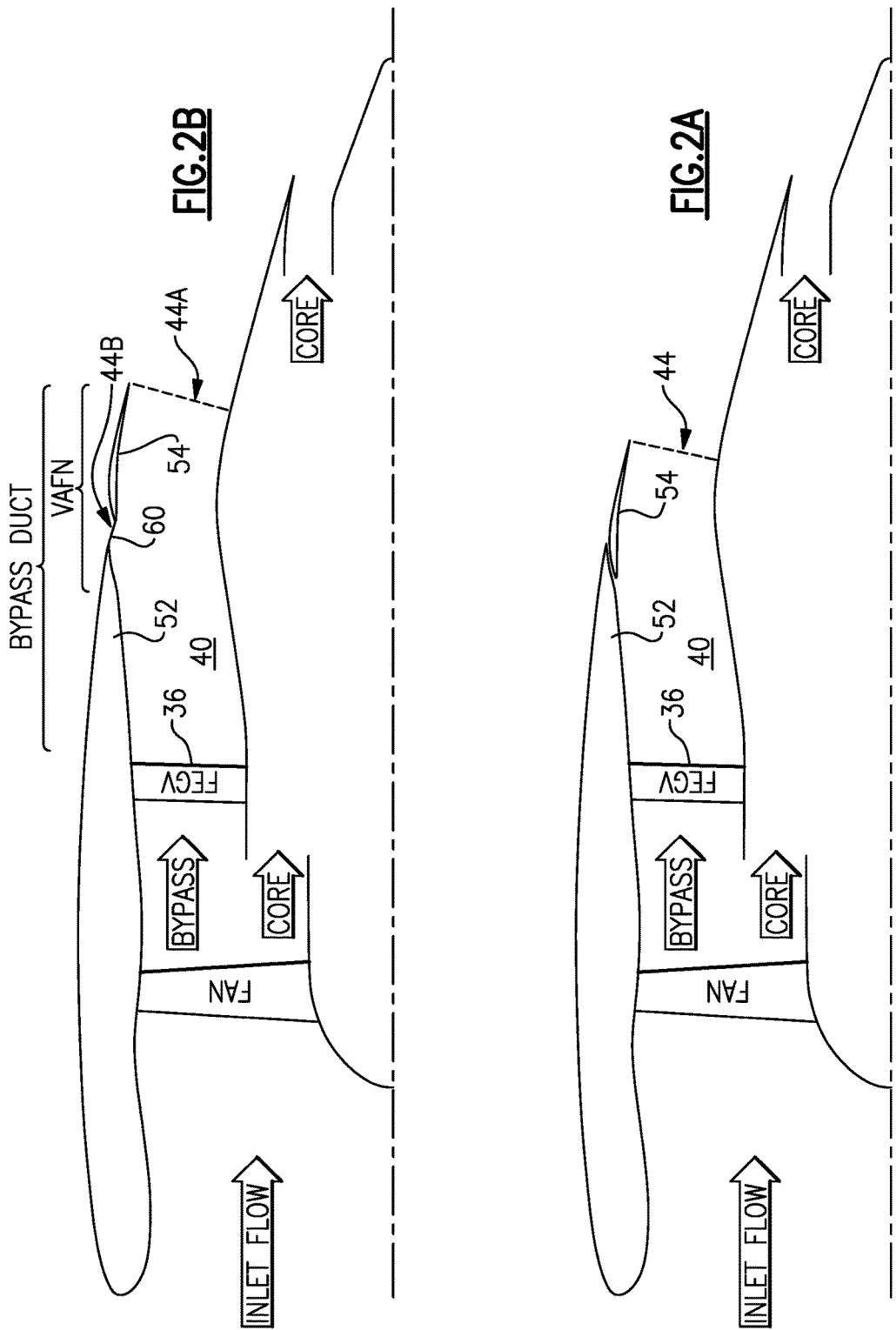

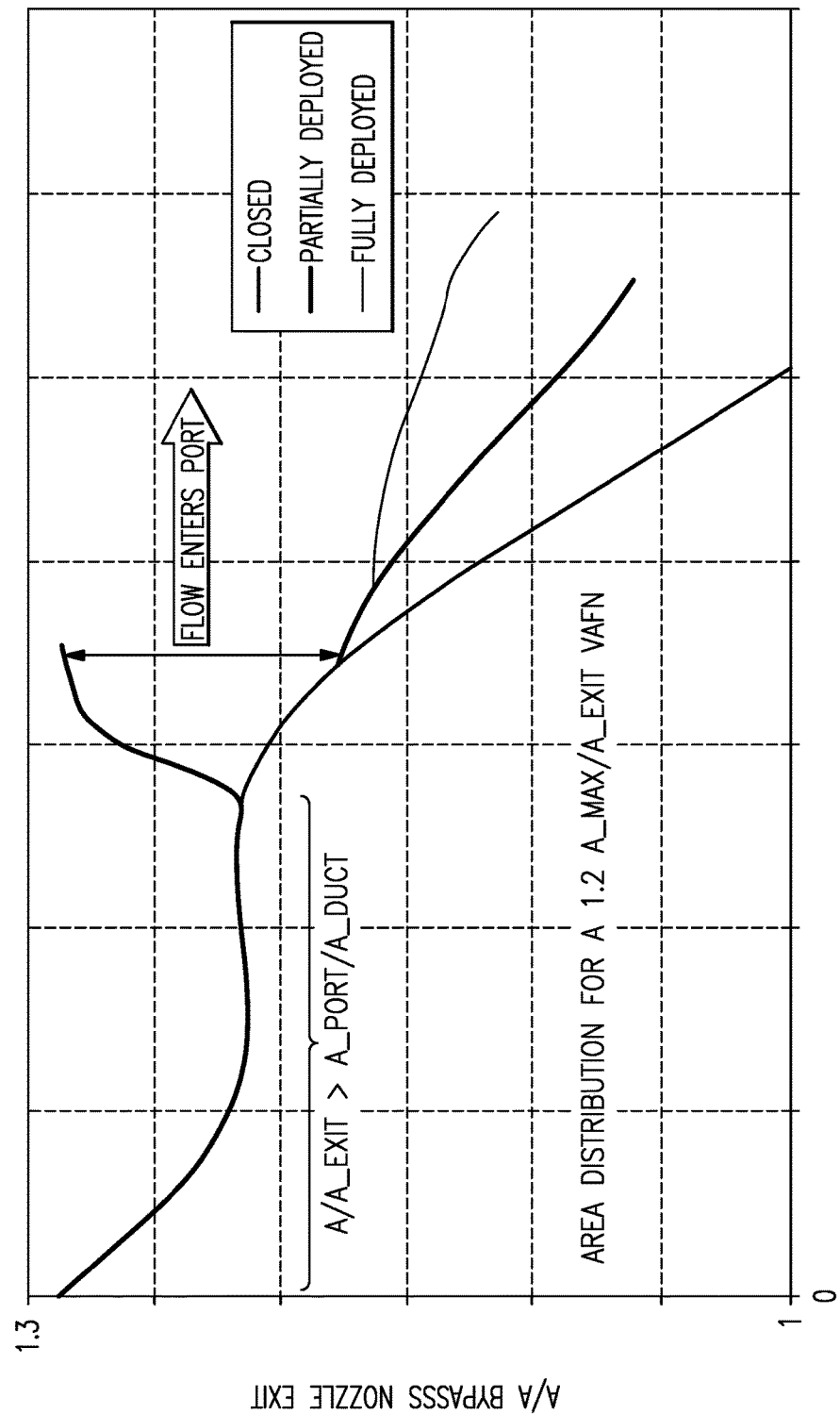

GAS TURBINE ENGINE WITH AXIAL MOVABLE FAN VARIABLE AREA NOZZLE

CROSS REFERENCE TO RELATED APPLICATIONS

The present disclosure is a continuation of U.S. patent application Ser. No. 15/360,053, filed Nov. 23, 2016, which is a continuation of U.S. patent application Ser. No. 13/314,365, filed Dec. 8, 2011, which is a continuation in part of U.S. patent application Ser. No. 11/843,675, filed Aug. 23, 2007 and issued as U.S. Pat. No. 8,074,440.

BACKGROUND

The present invention relates to a gas turbine engine, and more particularly to a turbofan engine having a fan variable area nozzle (VAFN) which moves axially to change a bypass flow path area thereof.

Conventional gas turbine engines generally include a fan section and a core engine with the fan section having a larger diameter than that of the core engine. The fan section and the core engine are disposed about a longitudinal axis and are enclosed within an engine nacelle assembly.

Combustion gases are discharged from the core engine through a core exhaust nozzle while an annular fan flow, disposed radially outward of the primary airflow path, is discharged through an annular fan exhaust nozzle defined between a fan nacelle and a core nacelle. A majority of thrust is produced by the pressurized fan air discharged through the fan exhaust nozzle, the remaining thrust being provided from the combustion gases discharged through the core exhaust nozzle.

The fan nozzles of conventional gas turbine engines have a fixed geometry. The fixed geometry fan nozzles are a compromise suitable for take-off and landing conditions as well as for cruise conditions. Some gas turbine engines have implemented fan variable area nozzles. The fan variable area nozzle provide a smaller fan exit nozzle diameter during cruise conditions and a larger fan exit nozzle diameter during take-off and landing conditions. Existing fan variable area nozzles typically utilize relatively complex mechanisms that increase overall engine weight to the extent that the increased fuel efficiency therefrom may be negated.

SUMMARY

A turbofan engine according to the present invention includes a fan variable area nozzle (VAFN) having a first fan nacelle section and a second fan nacelle section movably mounted relative the first fan nacelle section. The second fan nacelle section axially slides relative the fixed first fan nacelle section to change the effective area of the fan nozzle exit area. The VAFN changes the physical area and geometry of the bypass flow path during particular flight conditions. The VAFN is closed by positioning the second fan nacelle section in-line with the first fan nacelle section to define the fan nozzle exit area and is opened by moving the second fan nacelle section aftward to provide an increased fan nozzle exit area.

In operation, the VAFN communicates with the controller to effectively vary the area defined by the fan nozzle exit area. By adjusting the entire periphery of the second fan nacelle section in which all sectors are moved simultaneously, engine thrust and fuel economy are maximized during each flight regime by varying the fan nozzle exit area. By separately adjusting circumferential sectors of the second fan nacelle section to provide an asymmetrical fan nozzle exit area, engine bypass flow is selectively vectored to provide, for example only, trim balance, thrust controlled maneuvering, enhanced ground operations and short field performance.

The present invention therefore provides an effective, lightweight fan variable area nozzle for a gas turbine engine.

A nacelle assembly for a high-bypass gas turbine engine according to an exemplary aspect of the present disclosure may include a core nacelle defined about an engine centerline axis, a fan nacelle mounted at least partially around the core nacelle to define a fan bypass flow path for a fan bypass airflow, and a fan variable area nozzle axially movable relative the fan nacelle to define an auxiliary port to vary a fan nozzle exit area and adjust a pressure ratio of the fan bypass airflow during engine operation.

In a further non-limiting embodiment of any of the foregoing nacelle assembly embodiments, the controller may be operable to control the fan variable area nozzle to vary a fan nozzle exit area and adjust the pressure ratio of the fan bypass airflow.

In a further non-limiting embodiment of any of the foregoing nacelle assembly embodiments, the controller may be operable to reduce the fan nozzle exit area at a cruise flight condition.

In a further non-limiting embodiment of any of the foregoing nacelle assembly embodiments, the controller may be operable to control the aid fan nozzle exit area to reduce a fan instability.

In a further non-limiting embodiment of any of the foregoing nacelle assembly embodiments, the fan variable area nozzle may define a trailing edge of the fan nacelle.

In a further non-limiting embodiment of any of the foregoing nacelle assembly embodiments, the assembly may further include a controller operable to axially move the fan variable area nozzle to vary the fan nozzle exit area in response to a flight condition.

In a further non-limiting embodiment of any of the foregoing nacelle assembly embodiments, the fan variable area nozzle may be aligned with the fan nacelle to define a closed position of the fan nozzle exit area. Additionally or alternatively, the fan variable area nozzle is axially offset from the fan nacelle to define an open position of the fan nozzle exit area.

In a further non-limiting embodiment of any of the foregoing nacelle assembly embodiments, the nacelle assembly may further include a gear system driven by the core engine within the core nacelle to drive the fan within the fan nacelle, the gear system defines a gear reduction ratio of greater than or equal to about 2.3.

In a further non-limiting embodiment of any of the foregoing nacelle assembly embodiments, the nacelle assembly may further include a gear system driven by the core engine within the core nacelle to drive the fan within the fan nacelle, the gear system defines a gear reduction ratio of greater than or equal to about 2.5.

In a further non-limiting embodiment of any of the foregoing nacelle assembly embodiments, the nacelle assembly may further include a gear system driven by the core engine to drive the fan, the gear system defines a gear reduction ratio of greater than or equal to 2.5.

In a further non-limiting embodiment of any of the foregoing nacelle assembly embodiments, the core engine may include a low pressure turbine which defines a pressure ratio that is greater than about five (5).

In a further non-limiting embodiment of any of the foregoing nacelle assembly embodiments, the core engine may include a low pressure turbine which defines a pressure ratio that is greater than five (5).

In a further non-limiting embodiment of any of the foregoing nacelle assembly embodiments, the bypass flow may define a bypass ratio greater than about six (6).

In a further non-limiting embodiment of any of the foregoing nacelle assembly embodiments, the bypass flow may define a bypass ratio greater than about ten (10).

In a further non-limiting embodiment of any of the foregoing nacelle assembly embodiments, the bypass flow may define a bypass ratio greater than ten (10).

A gas turbine engine according to another exemplary aspect of the present disclosure may include a core nacelle defined about an engine centerline axis, a fan nacelle mounted at least partially around the core nacelle to define a fan bypass flow path for a fan bypass airflow; a fan variable area nozzle axially movable relative the fan nacelle to define an auxiliary port to vary a fan nozzle exit area and adjust a pressure ratio of the fan bypass airflow during engine operation, and a controller operable to control the fan variable area nozzle to vary a fan nozzle exit area and adjust the pressure ratio of the fan bypass airflow.

In a further non-limiting embodiment of any of the foregoing gas turbine embodiments, the gas turbine engine may be a direct drive turbofan engine.

In a further non-limiting embodiment of any of the foregoing gas turbine embodiments, the gas turbine may further include a low spool within the core nacelle that drives a fan within the fan nacelle through a geared architecture.

In a further non-limiting embodiment of any of the foregoing gas turbine embodiments, the engine may have a bypass ratio greater than 10:1 and the geared architecture may have a gear reduction ratio of greater than 2.5:1.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows:

FIG. 2A is a sectional side view of the VAFN in a closed position;

FIG. 2B is a sectional side view of the VAFN in an open position; and

FIG. 5 is a graph of a duct area distribution;

DETAILED DESCRIPTION

Figure 1A:
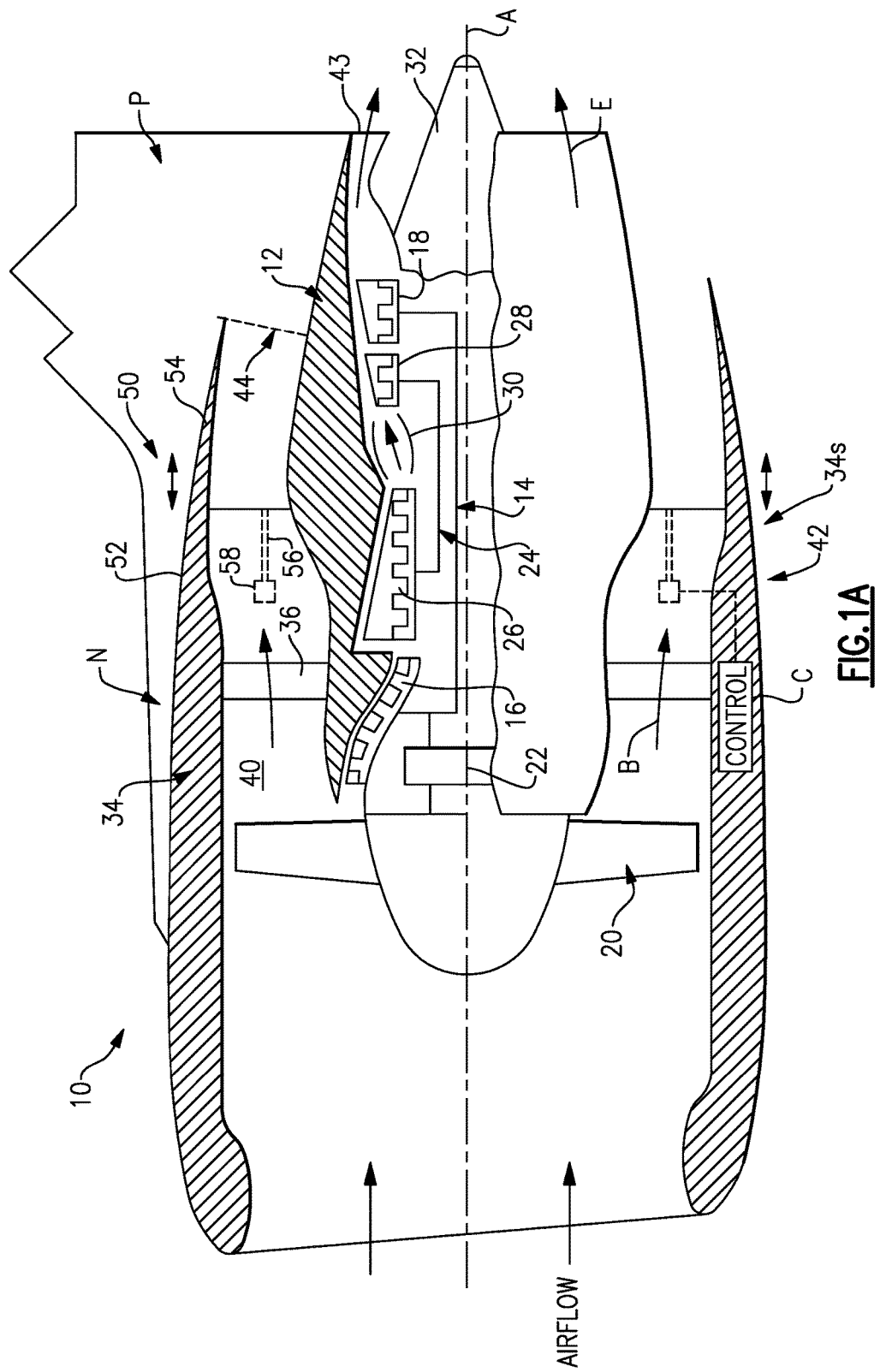
FIG. 1A is a general schematic partial fragmentary view of an exemplary gas turbine engine embodiment for use with the present invention.

FIG. 1A illustrates a general partial fragmentary schematic view of a gas turbofan engine 10 suspended from an engine pylon P within an engine nacelle assembly N as is typical of an aircraft designed for subsonic operation.

The turbofan engine 10 includes a core engine within a core nacelle 12 that houses a low spool 14 and high spool 24. The low spool 14 includes a low pressure compressor 16 and low pressure turbine 18. The low spool 14 drives a fan section 20 through a gear train 22. The high spool 24 includes a high pressure compressor 26 and high pressure turbine 28. A combustor 30 is arranged between the high pressure compressor 26 and high pressure turbine 28. The low and high spools 14, 24 rotate about an engine axis of rotation A.

The engine 10 is preferably a high-bypass geared architecture aircraft engine. In one disclosed, non-limiting embodiment, the engine 10 bypass ratio is greater than about six (6) to ten (10), the gear train 22 is an epicyclic gear train such as a planetary gear system or other gear system with a gear reduction ratio of greater than about 2.3 and the low pressure turbine 18 has a pressure ratio that is greater than about 5. In one disclosed embodiment, the engine 10 bypass ratio is greater than ten (10:1), the turbofan diameter is significantly larger than that of the low pressure compressor 16, and the low pressure turbine 18 has a pressure ratio that is greater than 5:1. The gear train 22 may be an epicycle gear train such as a planetary gear system or other gear system with a gear reduction ratio of greater than 2.5:1. It should be understood, however, that the above parameters are only exemplary of one embodiment of a geared architecture engine and that the present invention is applicable to other gas turbine engines including direct drive turbofans.

Airflow enters a fan nacelle 34, which at least partially surrounds the core nacelle 12. The fan section 20 communicates airflow into the core nacelle 12 to power the low pressure compressor 16 and the high pressure compressor 26. Core airflow compressed by the low pressure compressor 16 and the high pressure compressor 26 is mixed with the fuel in the combustor 30 and expanded over the high pressure turbine 28 and low pressure turbine 18. The turbines 28, 18 are coupled for rotation with, respective, spools 24, 14 to rotationally drive the compressors 26, 16 and through the gear train 22, the fan section 20 in response to the expansion. A core engine exhaust E exits the core nacelle 12 through a core nozzle 43 defined between the core nacelle 12 and a tail cone 32.

The core nacelle 12 is supported within the fan nacelle 34 by structure 36 often generically referred to as Fan Exit Guide Vanes (FEGVs). A bypass flow path 40 is defined between the core nacelle 12 and the fan nacelle 34. The engine 10 generates a high bypass flow arrangement with a bypass ratio in which approximately 80 percent of the airflow entering the fan nacelle 34 becomes bypass flow B. The bypass flow B communicates through the generally annular fan bypass flow path 40 and is discharged from the engine 10 through a fan variable area nozzle (VAFN) 42 which defines a fan nozzle exit area 44 between the fan nacelle 34 and the core nacelle 12 at a fan nacelle end segment 34S of the fan nacelle 34 downstream of the fan section 20.

Thrust is a function of density, velocity, and area. One or more of these parameters can be manipulated to vary the amount and direction of thrust provided by the bypass flow B. The VAFN 42 operates to effectively vary the area of the fan nozzle exit area 44 to selectively adjust the pressure ratio of the bypass flow B in response to a controller C. Low pressure ratio turbofans are desirable for their high propulsive efficiency. However, low pressure ratio fans may be inherently susceptible to fan stability/flutter problems at low power and low flight speeds. The VAFN allows the engine to change to a more favorable fan operating line at low power, avoiding the instability region, and still provide the relatively smaller nozzle area necessary to obtain a high-efficiency fan operating line at cruise.

A significant amount of thrust is provided by the bypass flow B due to the high bypass ratio. The fan section 20 of the engine 10 is preferably designed for a particular flight condition—typically cruise at about 0.8M and about 35,000 feet. As the fan blades within the fan section 20 are efficiently designed at a particular fixed stagger angle for an efficient cruise condition, the VAFN 42 is operated to effectively vary the fan nozzle exit area 44 to adjust fan bypass air flow such that the angle of attack or incidence on the fan blades is maintained close to the design incidence for efficient engine operation at other flight conditions, such as landing and takeoff to thus provide optimized engine operation over a range of flight conditions with respect to performance and other operational parameters such as noise levels.

Figure 1B:
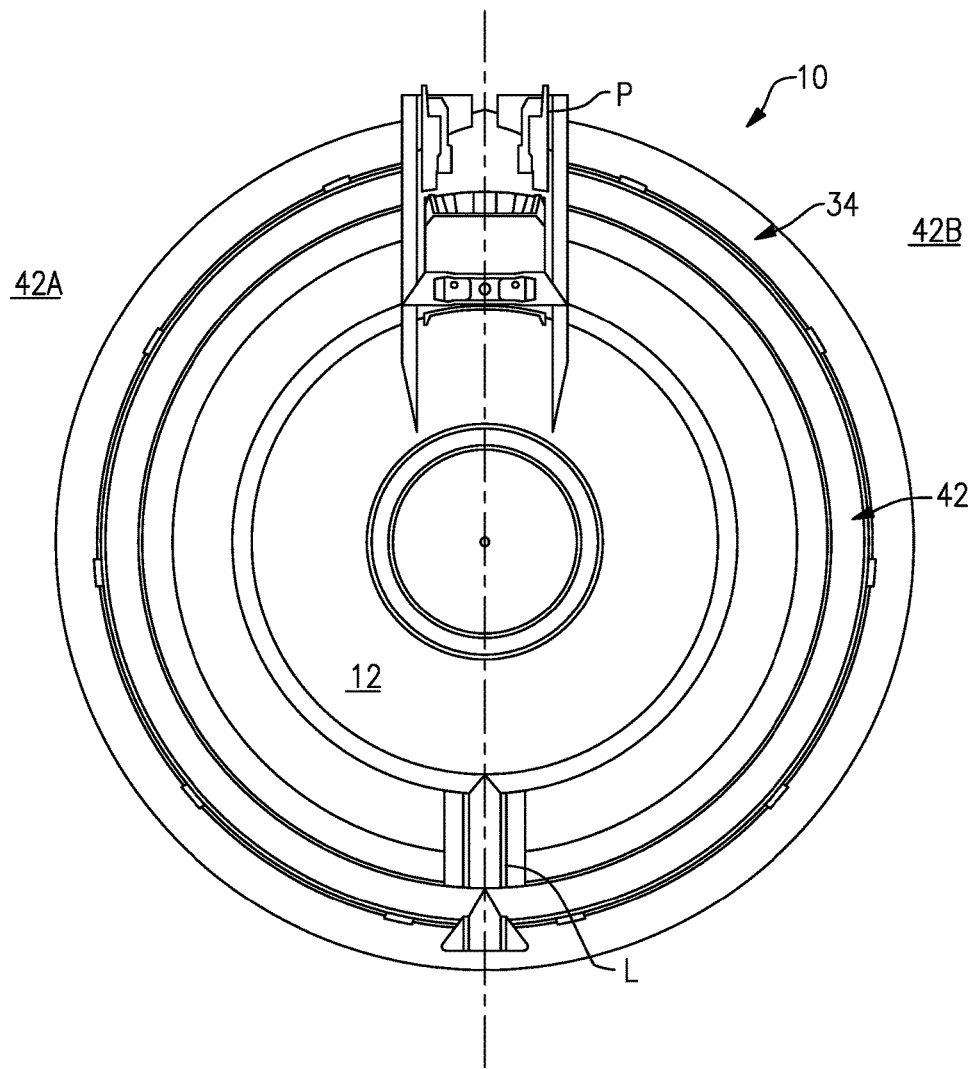
FIG. 1B is a rear view of the engine.
Figure 1C:
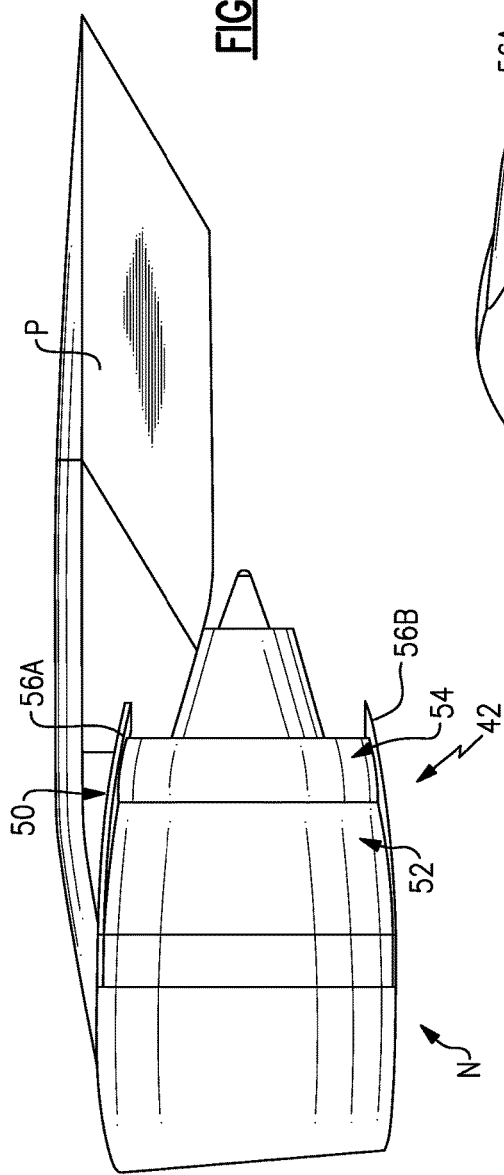
FIG. 1C is a side view of the engine integrated with a pylon.
Figure 1D:
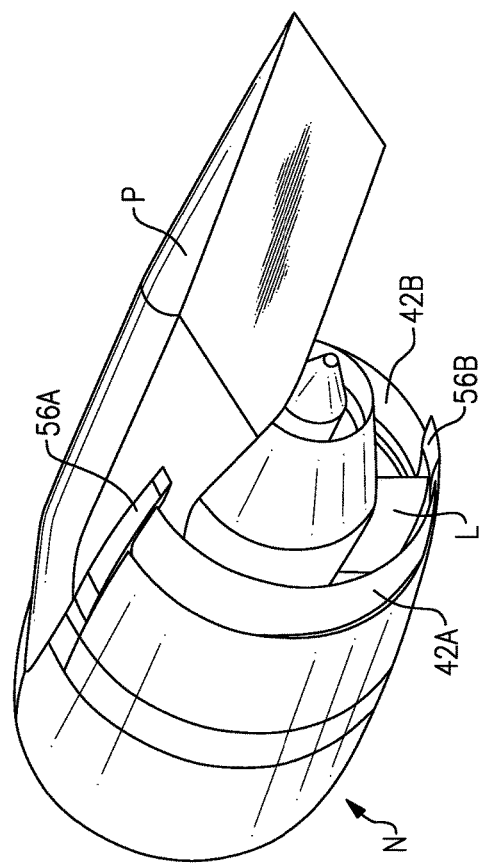
FIG. 1D is a perspective view of the engine integrated with a pylon.

The VAFN 42 is separated into at least two sectors 42A-42B (FIG. 1B) defined between the pylon P and a lower Bi-Fi splitter L which typically interconnects a larger diameter fan duct reverser cowl and a smaller diameter core cowl (FIGS. 1C and 1D). Each of the at least two sectors 42A-42B are independently adjustable to asymmetrically vary the fan nozzle exit area 44 to generate vectored thrust. It should be understood that although two segments are illustrated, any number of segments may alternatively or additionally be provided.

In operation, the VAFN 42 communicates with a controller C or the like to adjust the fan nozzle exit area 44 in a symmetrical and asymmetrical manner. Other control systems including an engine controller or aircraft flight control system may also be usable with the present invention. By adjusting the entire periphery of the VAFN 42 symmetrically in which all sectors are moved uniformly, thrust efficiency and fuel economy are maximized during each flight condition. By separately adjusting the circumferential sectors 42A-42B of the VAFN 42 to provide an asymmetrical fan nozzle exit area 44, engine bypass flow is selectively vectored to provide, for example only, trim balance or thrust controlled maneuvering enhanced ground operations or short field performance.

The VAFN 42 generally includes an auxiliary port assembly 50 having a first fan nacelle section 52 and a second fan nacelle section 54 movably mounted relative the first fan nacelle section 52. The second fan nacelle section 54 axially slides along the engine axis A relative the fixed first fan nacelle section 52 to change the effective area of the fan nozzle exit area 44. The second fan nacelle section 54 slides aftward upon a track fairing 56A, 56B (illustrated schematically in FIGS. 1C and 1D) in response to an actuator 58 (illustrated schematically). The track fairing 56A, 56B extend from the first fan nacelle section 52 adjacent the respective pylon P and the lower Bi-Fi splitter L (FIG. 1D).

The VAFN 42 changes the physical area and geometry of the bypass flow path 40 during particular flight conditions. The bypass flow B is effectively altered by sliding of the second fan nacelle section 54 relative the first fan nacelle section 52 between a closed position (FIG. 2A) and an open position (FIG. 2B). The auxiliary port assembly 50 is closed by positioning the second fan nacelle section 54 in-line with the first fan nacelle section 52 to define the fan nozzle exit area 44 as exit area F0 (FIG. 2A).

The VAFN 42 is opened by moving the second fan nacelle section 54 aftward along the track fairing 56A, 56B away from the first fan nacelle section 52 to open an auxiliary port 60 which extends between the open second fan nacelle section 54 relative the first fan nacelle section 52 to essentially provide an increased fan nozzle exit area 44 exit area F1. That is, the exit area F1 with the port 60 is greater than exit area F0 (FIG. 2B).

In one disclosed embodiment, the auxiliary port 60 is incorporated into the exhaust system of a high bypass ratio commercial turbofan engine within the bypass duct aft of the Fan Exit Guide Vanes (FEGVs; FIGS. 2A, 2B). The auxiliary port 60 is located in the aft section of the bypass duct outer wall.

Figure 3:
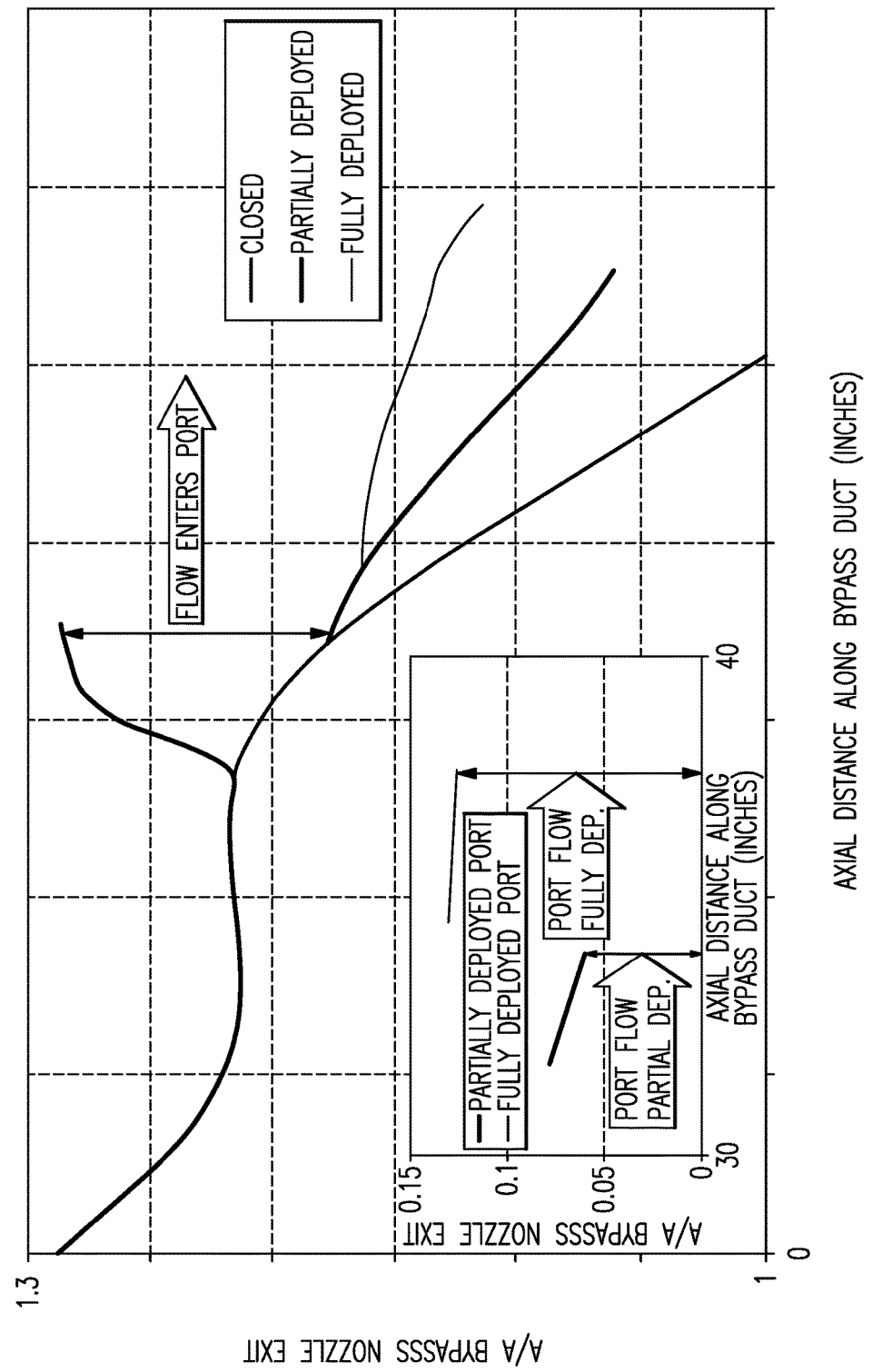
FIG. 3 is a graph of a bypass duct normalized cross-sectional area distribution.
Figure 4:
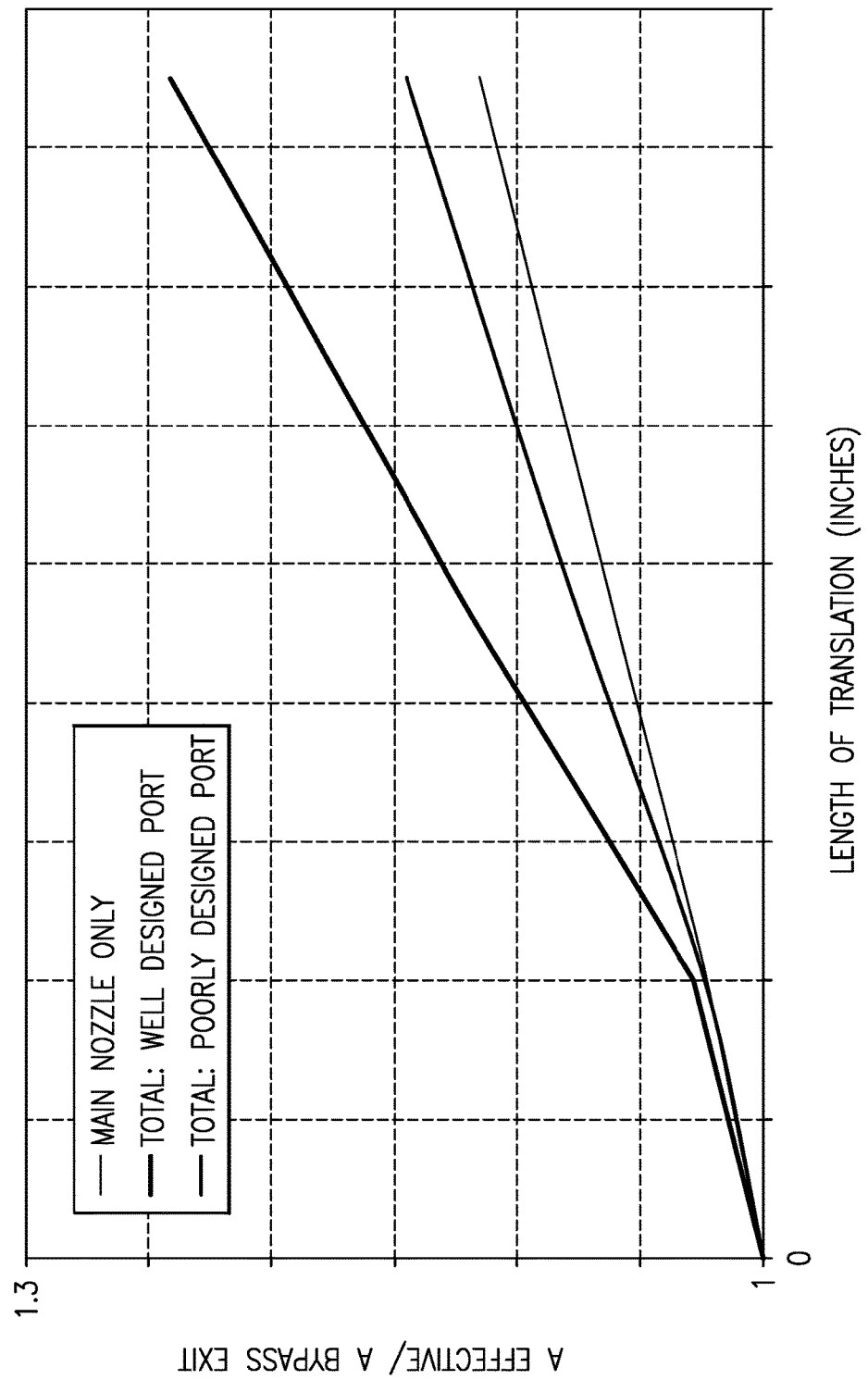
FIG. 4 is a graph of a Effective Area Increase vs. Nozzle Translation.

Referring to FIG. 3, the bypass duct area distribution, the effective area increase vs. translation (FIG. 4), area distribution (FIG. 5), and auxiliary port 60 location (FIG. 6A) and wall curvatures (FIG. 6B-6C) are tailored to provide a proper flow-field that allows the auxiliary port 60 to obtain the required additional effective exit area. The auxiliary port 60 will essentially double the effective area gain due to translation. The auxiliary port 60 provides a relatively low weight method of providing increased exit area to control the fan operating line without causing high system losses or unacceptable aircraft installation issues. By tailoring the bypass duct area distribution and outer wall curvature, the desired maximum effective area increase is achieved before the stroke of the auxiliary port 60 reaches its effective area increase limit.

The auxiliary port exit plane 44B (defined as the plane between the stationary section's trailing edge and the moving sections leading edge) initially has an opening in which the exit plane normal vector is near-axial, but as the stroke increases, the normal vector becomes more inclined and approaches a near-radial vector. Once the exit plane normal has become near-radial, the maximum auxiliary port effectiveness has been reached. Once this point is reached, the rate of the effective area vs. translation changes from steep slope of the "well designed port" the shallow rate of the "main nozzle only", since additional area will be provided through the main nozzle 44A due to the inward slope of the core nacelle 12. A well designed auxiliary port nozzle will achieve approximately +25% effective area before the port effectiveness limit is reached. That is, there is a limited range of stroke in which the auxiliary port doubles the rate of additional effectiveness. Outside of this range, the rate of additional effectiveness may be equivalent to a translating nozzle that has no auxiliary port. Or put another way, the auxiliary port reduces the stroke necessary for a pure translating nozzle to achieve a desired effective area.

Referring to FIG. 5, the cross-sectional area at the auxiliary port 60 is greater than the maximum required effective area of the VAFN 42 and the bypass duct area distribution is tailored to ensure the duct cross-sectional area forward of the auxiliary port 60 is greater than the port opening cross-sectional area. This avoids a situation where an upstream internal cross-section becomes the controlling flow area (i.e. is smaller than the exit area), which can lead to operational limits and structural issues.

Figure 6A:
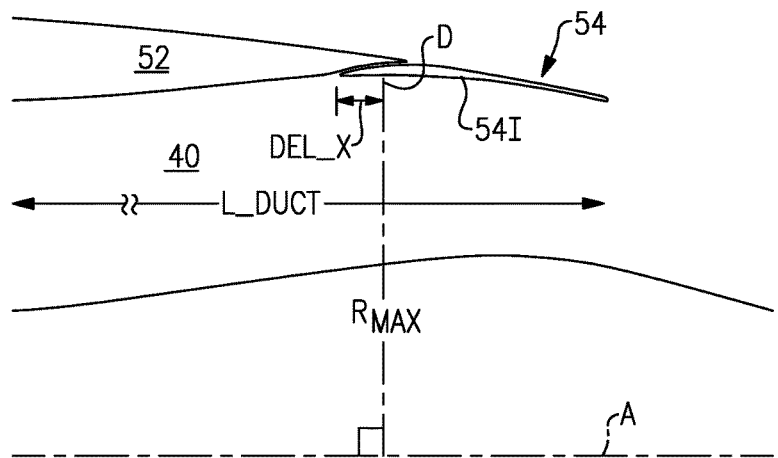
FIG. 6A is schematic geometric view of the auxiliary port location.
Figure 6B:
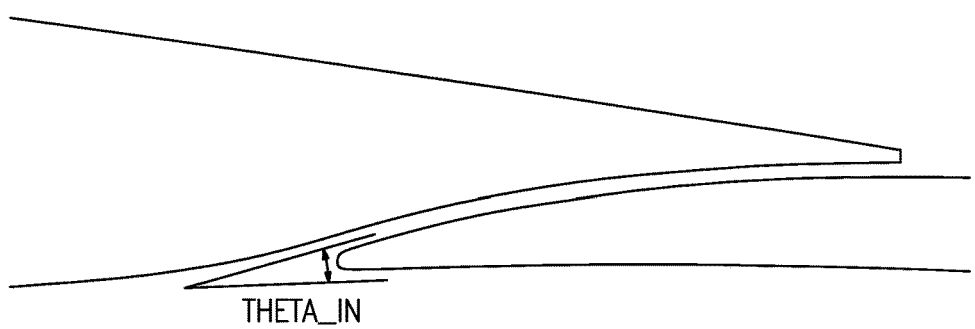
FIG. 6B is schematic geometric view of the auxiliary port entrance angle.
Figure 6C:
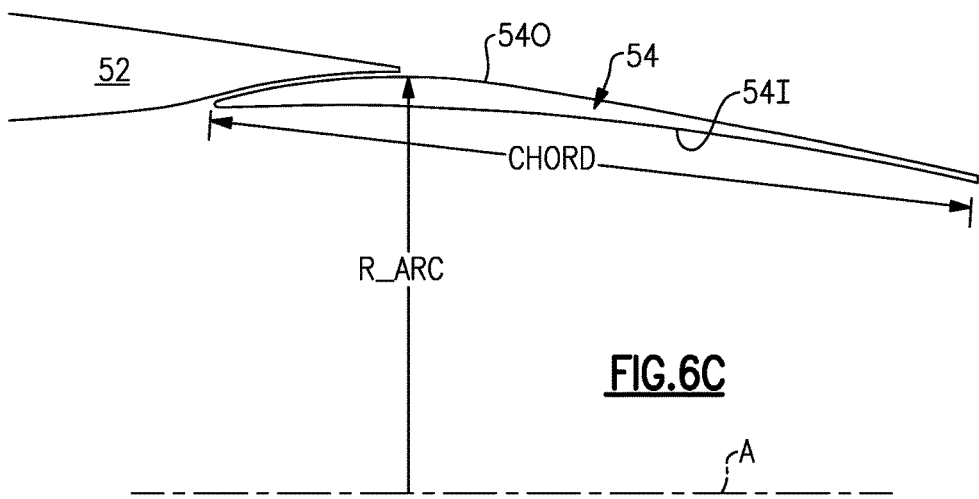
FIG. 6C is schematic geometric view of a VAFN outer surface curvature.

Referring to FIG. 6A, the auxiliary port 60 in the disclosed embodiment, is located no more forward than 0.1 DEL_X/L_DUCT defined from a point D at the largest radius Rmax of the annular fan bypass flow path 40 defined by the second fan nacelle section 54. Rmax is defined through point D and perpendicular to the engine axis A. Point D in the disclosed non limiting embodiment is located on an inner wall surface 54I of the second fan nacelle section 54 when the second fan nacelle section 54 is in a closed position. DEL_X is the axial distance to the forward most point of the auxiliary port 60 from Rmax. L_DUCT is the overall axial length of the annular fan bypass flow path 40. The angle between the mean port line and the fan duct outer wall is relatively low to provide well-behaved, low loss exit flow. In the disclosed embodiment, the auxiliary port 60 entrance angle (Theta_in) relative to the fan bypass duct OD wall, is less than 20 degrees (FIG. 6B) while the outer VAFN surface has an R_ARC/CHORD>0.7 where R_ARC is a radial distance from the engine axis A to a radial outer wall surface 54O of the second fan nacelle section 54 and CHORD is the chord length of the second fan nacelle section 54 (FIG. 6C). The curvature of the outer wall surface 54O near the auxiliary port 60 promotes flow through the auxiliary port 60. In one disclosed embodiment, the stroke of the second fan nacelle section 54 necessary to obtain an additional 20% effective exit area is approximately 8.4 inches.

In operation, the VAFN 42 communicates with the controller C to move the second fan nacelle section 54 relative the first fan nacelle section 52 of the auxiliary port assembly 50 to effectively vary the area defined by the fan nozzle exit area 44. Various control systems including an engine controller or an aircraft flight control system may also be usable with the present invention. By adjusting the axial position of the entire periphery of the second fan nacelle section 54 in which all sectors are moved simultaneously, engine thrust and fuel economy are maximized during each flight regime by varying the fan nozzle exit area. By separately adjusting the sectors of the second fan nacelle section 54 to provide an asymmetrical fan nozzle exit area 44, engine bypass flow is selectively vectored to provide, for example only, trim balance, thrust controlled maneuvering, enhanced ground operations and short field performance.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A turbofan engine comprising:
    a fan section including a plurality of fan blades, the plurality of fan blades having a fixed stagger angle and a design angle of incidence;
    a low pressure turbine driving the plurality of fan blades through a gear train, the low pressure turbine having a pressure ratio greater than 5:1, and the gear train having a gear reduction ratio of greater than 2.5:1;
    a fan nacelle and a core nacelle extending along an engine axis of rotation, the fan nacelle at least partially surrounding the core nacelle and the plurality of fan blades;
    a fan bypass flow path defined between the core nacelle and the fan nacelle, the core nacelle contoured along the fan bypass flow path with respect to the engine axis of rotation, and a bypass ratio greater than 10:1;
    a fan variable area nozzle in communication with a controller and with the fan bypass flow path, and defining a fan nozzle exit area between the fan nacelle and the core nacelle; and
    wherein the fan variable area nozzle varies a geometry of the bypass flow path and varies the fan nozzle exit area to adjust fan bypass air flow in the fan bypass flow path in response to the controller in a plurality of flight conditions such that the engine is allowed to change to a more favorable fan operating line, avoids an instability region of the fan section, and maintains an angle of incidence of the plurality of fan blades in the plurality of flight conditions that is close to the design angle of incidence on the plurality of fan blades.

2. The turbofan engine as recited in claim 1, wherein the fan variable area nozzle includes a first fan nacelle section, and a second fan nacelle section movably mounted relative the first fan nacelle section and moveable axially along the engine axis of rotation relative the first fan nacelle section.

3. The turbofan engine as recited in claim 2, comprising a low pressure compressor and a high pressure compressor each including a plurality of stages, and a two stage high pressure turbine driving the high pressure compressor, wherein the low pressure turbine drives the low pressure compressor.

4. The turbofan engine as recited in claim 3, further comprising a duct defined between the fan nacelle and the core nacelle forward of the fan variable area nozzle, the duct having a duct maximum area, and wherein the duct maximum area is greater than the fan nozzle exit area with the fan variable area nozzle in a fully open position.

5. The turbofan engine as recited in claim 4, wherein the low pressure turbine is a three stage low pressure turbine.

6. The turbofan engine as recited in claim 5, wherein the fan variable area nozzle has an effective area increase limit, the fan nozzle exit area has a maximum effective area increase, and the fan variable area nozzle achieves the maximum effective area increase of the fan nozzle exit area in operation before the fan variable area nozzle has reached the effective area increase limit.

7. The turbofan engine as recited in claim 4, wherein the duct has a duct area distribution and outer wall curvature that is tailored such that the maximum effective area increase of the fan nozzle exit area is achieved in operation before the fan variable area nozzle has reached the effective area increase limit.

8. The turbofan engine as recited in claim 7, wherein the fan variable area nozzle causes the fan nozzle exit area to decrease for a cruise operating condition, and the fan variable area nozzle causes the fan nozzle exit area to increase for a landing operating condition.

9. The turbofan engine as recited in claim 8, wherein the fan variable area nozzle includes a plurality of sectors, and each of the plurality of sectors are simultaneously moveable.

10. The turbofan engine as recited in claim 2, wherein the second fan nacelle section is moveable along the engine axis of rotation relative to the first fan nacelle section to define an auxiliary port extending between the first fan nacelle section and the second fan nacelle section.

11. The turbofan engine as recited in claim 10, wherein the fixed stagger angle is set with respect to a cruise operating condition.

12. The turbofan engine as recited in claim 11, wherein the fan variable area nozzle causes the fan nozzle exit area to decrease for the cruise operating condition, and the fan variable area nozzle causes the fan nozzle exit area to increase for a landing operating condition.

13. The turbofan engine as recited in claim 12, wherein the fan variable area nozzle includes a plurality of sectors, and each of the plurality of sectors are simultaneously moveable.

14. The turbofan engine as recited in claim 13, wherein the second fan nacelle section defines a trailing edge of the fan variable area nozzle.

15. The turbofan engine as recited in claim 14, wherein the fan variable area nozzle has a maximum required effective area, and the fan nozzle exit area with the fan variable area nozzle in a fully open position is greater than the maximum required effective area of the fan variable area nozzle.

16. A turbofan engine comprising:
a fan section including a plurality of fan blades, the plurality of fan blades having a design angle of incidence;
a gear train including a planetary gear system having a gear reduction ratio of greater than 2.5:1;
a low pressure turbine driving the plurality of fan blades through the gear train;
a fan nacelle and a core nacelle extending along an engine axis of rotation, the fan nacelle at least partially surrounding the core nacelle and the plurality of fan blades;
a fan bypass flow path defined between the core nacelle and the fan nacelle, the core nacelle contoured along the fan bypass flow path with respect to the engine axis of rotation, and a bypass ratio greater than 10:1;
a fan variable area nozzle in communication with a controller and with the fan bypass flow path, and defining a fan nozzle exit area between the fan nacelle and the core nacelle; and
wherein the fan variable area nozzle varies a geometry of the bypass flow path and varies the fan nozzle exit area to adjust fan bypass air flow in the fan bypass flow path in response to the controller in a plurality of flight conditions such that the engine is allowed to change to a more favorable fan operating line, avoid an instability region of the fan section, and maintain an angle of incidence of the plurality of fan blades in the plurality of flight conditions that is close to the design angle of incidence on the plurality of fan blades.

17. The turbofan engine as recited in claim 16, wherein the fan variable area nozzle includes a plurality of sectors, and each of the plurality of sectors are simultaneously moveable.

18. The turbofan engine as recited in claim 17, wherein the low pressure turbine includes a pressure ratio greater than 5:1.

19. The turbofan engine as recited in claim 18, further comprising a two stage high pressure turbine, and a low spool including a low pressure compressor and the low pressure turbine, the low spool driving the low pressure compressor and the planetary gear system.

20. The turbofan engine as recited in claim 17, further comprising a duct defined between the fan nacelle and the core nacelle forward of the fan variable area nozzle, the duct having a duct maximum area, and wherein the duct maximum area is greater than the fan nozzle exit area with the fan variable area nozzle in a fully open position.

21. The turbofan engine as recited in claim 20, wherein the fan variable area nozzle causes the fan nozzle exit area to increase for a landing operating condition, and the fan variable area nozzle causes the fan nozzle exit area to decrease for a cruise operating condition.

22. The turbofan engine as recited in claim 21, wherein the low pressure turbine includes a pressure ratio greater than 5:1.

23. The turbofan engine as recited in claim 21, wherein the plurality of fan blades include a fixed stagger angle.

24. The turbofan engine as recited in claim 23, wherein the fan variable area nozzle has a maximum required effective area, and the fan nozzle exit area with the fan variable area nozzle in the fully open position is greater than the maximum required effective area of the fan variable area nozzle.

25. The turbofan engine as recited in claim 24, further comprising a two stage high pressure turbine driving a high pressure compressor.

26. The turbofan engine as recited in claim 25, wherein the low pressure turbine is a three stage low pressure turbine.

27. The turbofan engine as recited in claim 26, wherein the low pressure turbine includes a pressure ratio greater than 5:1.

28. The turbofan engine as recited in claim 27, wherein the fan variable area nozzle has an effective area increase limit, the fan nozzle exit area has a maximum effective area increase, and the fan variable area nozzle achieves the maximum effective area increase of the fan nozzle exit area in operation before the fan variable area nozzle has reached the effective area increase limit.

29. The turbofan engine as recited in claim 28, wherein the fan variable area nozzle includes a first fan nacelle section, and a second fan nacelle section movably mounted relative the first fan nacelle section and moveable axially along the engine axis of rotation relative the first fan nacelle section, and wherein the second fan nacelle section is moveable along the engine axis of rotation relative to the first fan nacelle section to define an auxiliary port extending between the first fan nacelle section and the second fan nacelle section.

30. The turbofan engine as recited in claim 29, further comprising a low spool including a low pressure compressor and the low pressure turbine, the low spool driving the low pressure compressor and the planetary gear system.

* * * * *